United States Patent [19]
Quaglia

[11] Patent Number: 5,542,752
[45] Date of Patent: Aug. 6, 1996

[54] WHEEL PRODUCT COMPRISED OF A NEW WHEEL TREAD LOCK AND A NEW WHEEL TREAD MATERIAL

[76] Inventor: Lawrence D. Quaglia, 917 Quincy Ave., Bronx, N.Y. 10465

[21] Appl. No.: 27,081

[22] Filed: Mar. 5, 1993

[51] Int. Cl.$^6$ ............................................. B60B 5/02
[52] U.S. Cl. .......................... 301/64.7; 301/5.3; 152/323; 152/394
[58] Field of Search .................... 301/64.7, 5.3, 301/5.7, 95; 152/323, 324, 325, 326, 327, 328, 329, 393, 394

[56] References Cited

U.S. PATENT DOCUMENTS

| Re. 29,890 | 1/1979 | Gomberg | 152/313 |
|---|---|---|---|
| 1,288,949 | 12/1918 | Malloy | 152/394 X |
| 1,576,924 | 3/1926 | Malloy | 152/394 X |
| 2,083,766 | 6/1937 | Wittkopp | 152/394 X |
| 2,262,714 | 11/1941 | Ware | 301/5.3 |
| 2,618,490 | 11/1952 | Frischmann | 301/5.7 X |
| 3,578,812 | 5/1971 | Taussig | 301/64.7 |
| 3,860,052 | 1/1975 | Schroeder | 152/354 |
| 3,936,576 | 2/1976 | Kay | 428/424 |
| 3,939,294 | 2/1976 | Fieldhouse | 428/424 |
| 4,244,413 | 1/1981 | Takahashi et al. | 301/64.7 X |
| 4,592,595 | 6/1986 | Freeman | 301/64.7 |

FOREIGN PATENT DOCUMENTS

| 670624 | 1/1939 | Germany | 152/394 |
|---|---|---|---|
| 464381 | 4/1937 | United Kingdom | 301/64.7 |

*Primary Examiner*—Russell D. Stormer
*Attorney, Agent, or Firm*—Lawrence D. Quaglia

[57] ABSTRACT

A wheel tread locking circular groove invention designed primarily to bond very difficult to bond materials to a given wheel hub or wheel rim without an adhesive which could be used for commercial, industrial, automotive, and all other purposes where a revolutionary state-of-the-art wheel product is needed. The resultant benefits of the locking circular grooves are derived from specific mathematical ratios. These mathematical ratios are a product of groove design dimensions. Another part of the invention is to bring together the wheel tread locking invention with a newly developed state-of-the-art engineering thermoplastic polyurethane resin designated as Isoplast® grade 202 with specifications far superior to that of any conventional material that can be used for wheel tread material forming a new product that has been needed for a very long time. This resultant combination of the present invention with the Isoplast® grade 202 will benefit everyone in the country, as all goods, food products, etc., ride over a wheel by truck or by skid on an electric pallet jack.

15 Claims, 10 Drawing Sheets

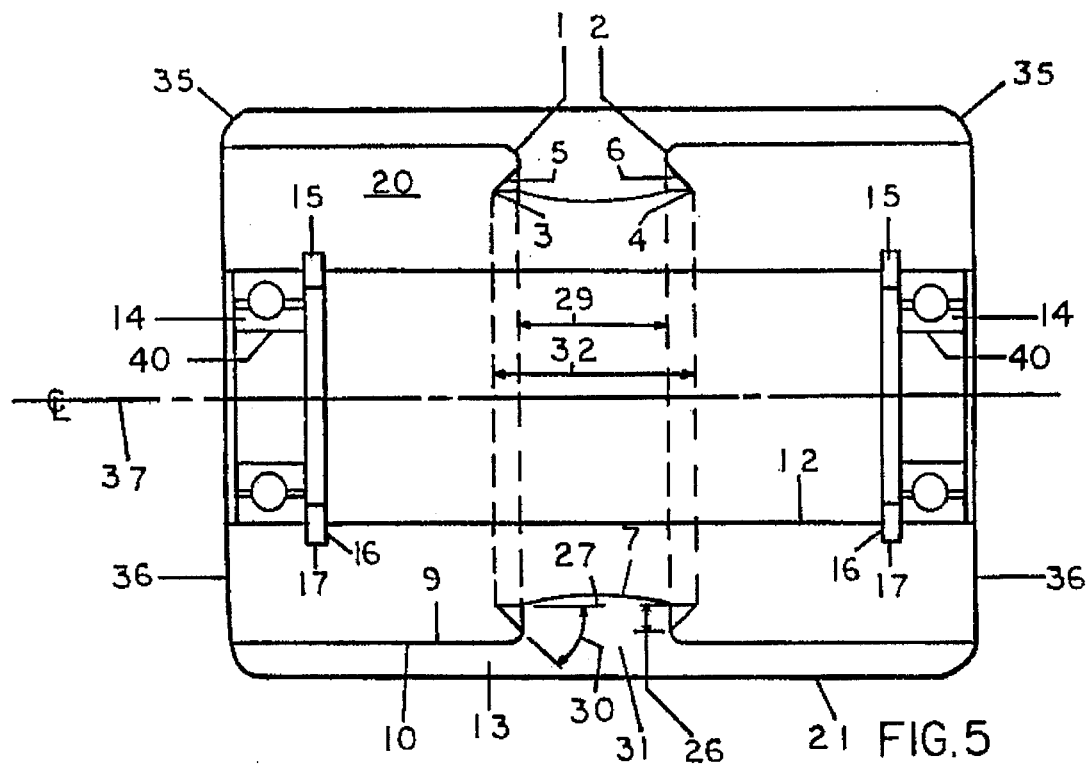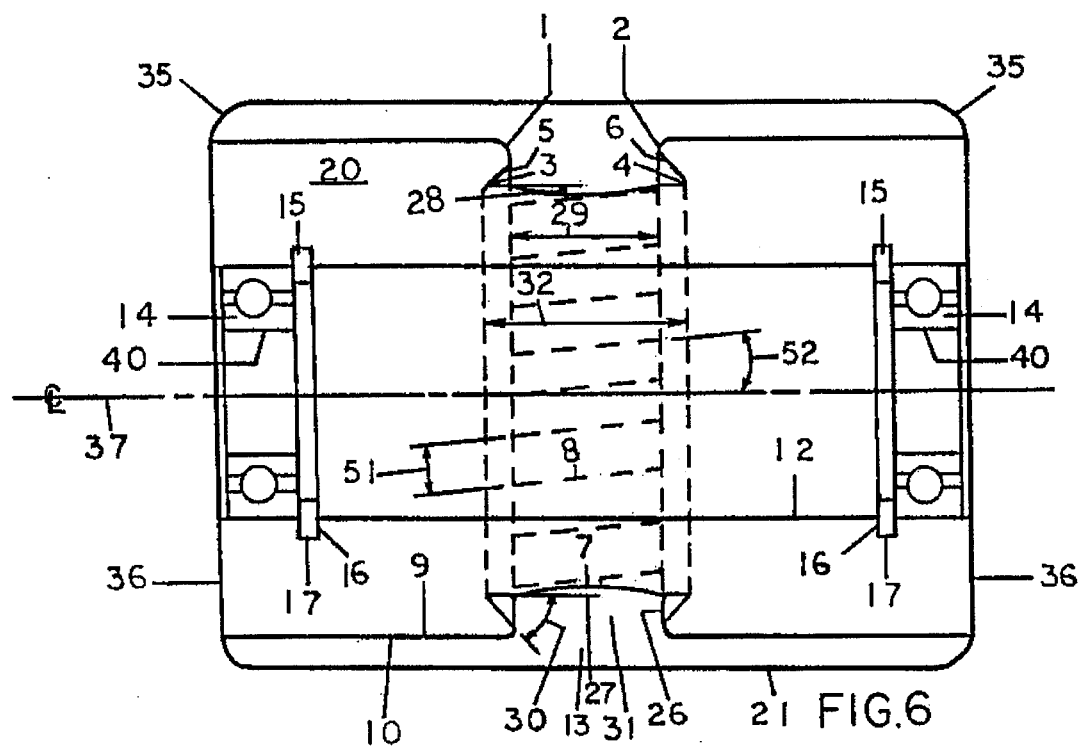

WHEEL PRODUCT COMPRISED OF A NEW WHEEL TREAD LOCK AND A NEW WHEEL TREAD MATERIAL

FIELD OF INVENTION

The present invention provides the best bonding or wheel tread material to a wheel hub or other wheel rim assembly. It makes use of new principles of design with specific mathematical ratios involving positive hold down power with minimum depth of locking circular groove or grooves. To create a new wheel product consisting of two new items; one, the wheel tread lock invention and two, the new Isoplast® 202 tread material. These locking circular grooves are specially designed for Isoplast® and an alternate material known as Victrex Peek® This is the first full capacity load wheel with a safety factor of two to date, for my invention, without any other polyurethane load wheel being available with at least a full load rating and equal safety factor of one, and providing many benefits while being chemically resistant to harmful chemicals. The following material was mentioned in Disclosure Documents Numbers 276196 dated Mar. 5, 1991 and 276157 dated Mar. 14, 1991.

BACKGROUND OF THE INVENTION

There have been various tread locking devices disclosed in the prior art.

Examples of the prior art are U.S. Pat. Nos.: 4,246,947 to Ewing, dated Jan. 27, 1981; 2,152,684 to E. A. Grange, dated Apr. 4, 1939; 2,152,685 to E. A. Grange, dated Apr. 4, 1939; 1,943,881 to R. R. Ware, dated Jan. 16, 1934; 1,0577462 to F. W. Kremer, dated Apr. 1, 1913; 848,745 to J. E. Hopkinson, dated Apr. 2, 1907; 824,345 to M. A. Elliott, dated Jun. 26, 1906; 813,423 to H. Hill, dated Feb. 27, 1906; 771,947 to J. A. Swinehart, dated Oct. 11, 1904.

The previous prior art affords only marginal performance under limited conditions. The average polyurethane wheels although somewhat harder than rubber wheels, but still being resillient provide a good coefficient of friction for traction and a higher load rating when compared to rubber wheels. The present invention is far superior in that basically, it has only two parts, but yet provides the best tread locking possible along with the highest load rating possible, for a polyurethane wheel. Another feature is that a new type of wheel is created for the materials handling industry; namely, the best pallet jack load wheel to date, with a sufficient safety factor of at least 2 for the load rating, in the polyurethane class of wheels used on electric pallet jack machines. This safety factor enables the driven electric pallet jack machines to carry their rated load, not a partial load as for conventional load wheels. The present invention operates under all weather conditions. The present invention can be applied to all types of wheels, industrial, automotive, and rollers for heavy loads with low height from bottom of vehicle to floor. It is the first wheel assembly of its kind to match the weight load rating (tire load rating) of a conventional heavy truck class rating; example: conventional rubber tire used for Interstate use, conventional road use, and off the road use, etc.

The wheel assembly is also highly resistant to acids, fuels such as gasoline, diesel fuel, other liquid fuels, and other chemicals; caustic alkali materials, caustic acids, sulfuric acids, hydrochloric acids, chemical solvents, etc. This is achieved through the use of Isoplast® grade 202 material molded onto the wheel tread locking hub. This is the product for the future available today.

SUMMARY

The present invention offers many significant improvements over the prior art. Its primary purpose is to lock on rigid to soft engineering thermoplastic polyurethane materials that have little to moderate resilience and other wheel tread materials while providing an underlying support for the rolling load with ductility without weakening the contact areas where the locking circular groove contacts the wheel tread material and to bond difficult to bond engineering thermoplastic resins being somewhat harder and a lot stronger than conventional wheel tread materials. The wheel tread lock is designed to give the best tread locking possible with one or more locking circular grooves within the wheel hub outer circumference locking on and supporting the tread material (also known as the tire), around said wheel hub. The wheel hub can also be any larger wheel hub rim or pulley sheave in diameter width of wheel size, etc. This set up does not allow any rotation or movement of wheel tread either in the locking circular groove or around the wheel wub circumference. This concept enables the present invention to have the best mechanical advantage offering the greatest strength possible for a given size of wheel hub.

The present invention will supply the best bonding that can be achieved, by using a mathematically designed locking circular groove or grooves that are different from any of the previous prior art. Also with the use of newly invented manufacturing principles completely new and different from any used previously or in use today, along with precision and standardization of locking circular groove design, dimensions and performance between the wheel tread lock hub and the wheel tread molded and bonded to it. This bonding is achieved through the new invention of the tread locking circular groove. The new tread locking circular groove design offers this significant improvement over the prior art, achieved through machining the Wheel Hubs by using specially designed form cutting tools. These form cutting tools are used to construct a groove that matches the shape form of the tool for the locking circular grooves while controlling the dimensions with regard to the radii and the depth of the locking circular groove as well as the angle of the sides precisely to provide the specific ratios, for radius to depth for the locking circular groove mentioned here in this invention. Additionally, a one-part epoxy can be used to aid in the molding process for adhesion and sealing purposes between the wheel tread lock groove and the wheel tread material. This wheel tread material can be called "the tire" for description purposes herein.

BRIEF DESCRIPTION OF DRAWINGS

A Numerical Index:

For FIGS. 1–16

Figure 1:
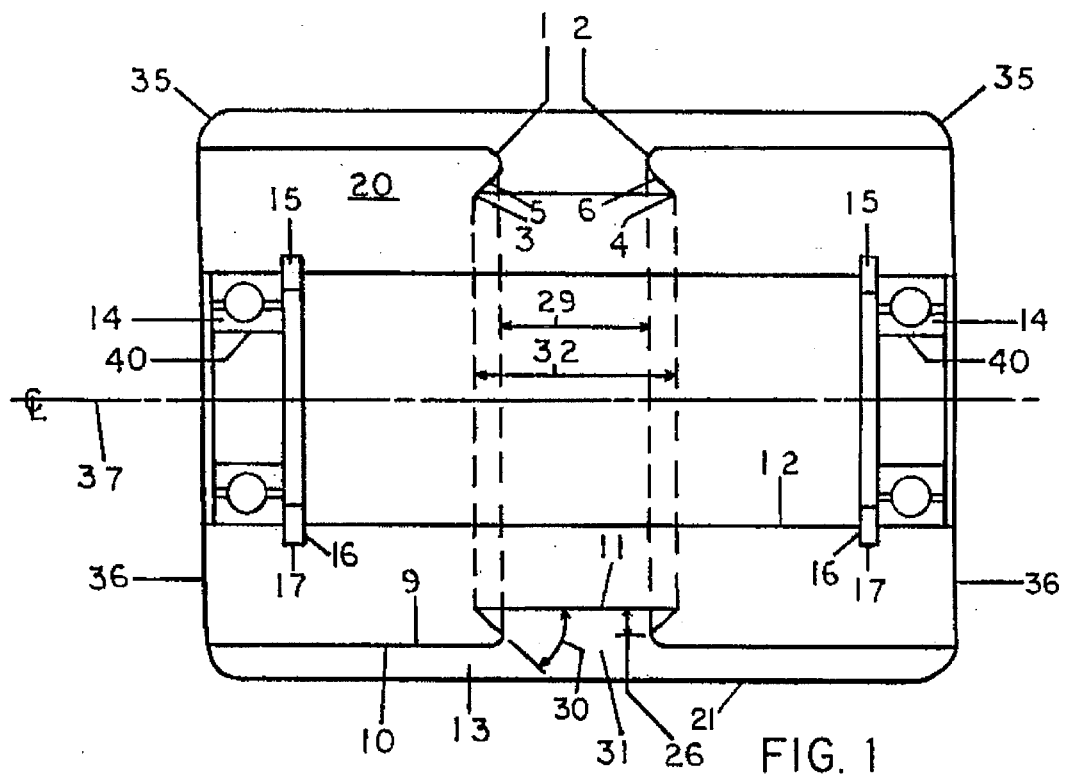

Nos. 1 and 2 are the radii points at the entrance of the tread locking circular groove between circumference 9 and internal circular inclined angled sides 5 and 6 respectively which run circumferentially around the wheel hub body 20.

Nos. 3 and 4 are the internal circular corners contacting the ends of the concave radius 7 or straight surface 11 in the tread locking circular groove.

Nos. 5 and 6 are the internal circular inclined angled sides for FIGS. 1–12, and the internal circular parallel sides for FIGS. 13–16 of the tread locking circular groove.

No. 7 is a concave radius in the bottom of the tread locking circular groove running continuously 360° around the center and axially between the internal circular corners 3 and 4 of the wheel hub body 20.

Nos. 8 are the channel grooves running axially either straight or on angles in the bottom of the tread locking circular groove that run continuously 360° around the center of the wheel hub body 20.

No. 9 is the outer circumference on the wheel hub body 20.

No. 10 is the inner surface of the wheel tread body 13 contacting the outer circumference 9 on the wheel hub body 20.

No. 11 is the straight surface in the bottom of the tread locking circular groove running continuously 360° around the center and axially between the internal circular corners 3 and 4 of the wheel hub body 20.

No. 12 is the internal wheel bearing bore running straight through the wheel hub body 20 axially and is always concentric to the outer circumference 9 of the wheel hub body 20.

No. 13 is the wheel tread material body.

Nos. 14 are the inner wheel bearings; ball, roller, tapered roller, etc. for the wheel hub assembly.

Nos. 15 are the internal snap rings for axial bearing positions.

Nos. 16 are the depth stops for internal snap rings Nos. 15.

Nos. 17 are the groove widths for the internal snap rings Nos. 15.

Nos. 18 and 19 are the protruding bulbs.

No. 20 is the wheel hub body.

No. 21 is the outer wheel tread surface contacting the ground.

No. 22 is the internal lubrication channel running axially through the internal bearing bore 12 between depth stops 16 and 16.

Nos. 23 and 24 are corners between the bulbs 18 and the side 5, and the bulb 19 and the side 6 respectively.

No. 25 is the epoxy adhesive.

No. 26 is the depth of the Locking Circular Groove for the concentric Locking Circular Grooves measured from the internal circular corners 3 or 4 to the outer circumference surface 9.

No. 27 is the depth from the center (deepest point) of the concave radius 7 to either of the internal circular corners 3 or 4.

No. 28 is the depth of the channels 8 in the Locking Circular Groove to either of the internal circular corners 3 or 4.

No. 29 is the width of opening between radii points 1 and 2 of the Locking Circular Groove.

No. 30 is the angle between the internal circular inclined angle sides 5 and 6 the maximum to width 32 of the Locking Circular Groove between internal circular corners 3 and 4 respectively.

No. 31 is the locking circular groove area.

No. 32 is the maximum width of the Locking Circular Groove containing concave radius 7 or straight surface 11 between the internal circular corners 3 and 4.

No. 33 is the minor depth of the eccentric locking circular groove or grooves.

No. 34 is the major depth of the eccentric locking circular groove or grooves.

No. 35 is the outer tread material radius of the tread material 13 located where the outer wheel tread surface 21 contacts the side ends 36 on either side of the wheel hub body 20 and running circumferentially.

No. 36 is a side end of the wheel hub body 20.

No. 37 is the centerline axis of the bearing bore 12.

No. 38 is the centerline of the eccentric locking groove, that is offset from the centerline 37.

No. 39 is the amount of measured offset between centerline axis of rotation 37 and centerline of eccentric locking groove 38.

No. 40 is the inner race bore of the wheel bearing 14 used in bearing bore 12.

No. 41 connecting point of side wall to road tread surface 49.

No. 42 side wall surface area.

No. 43 tire inflation valve.

No. 44 support wheel rim for tire.

No. 45 contact surface area to road outer circumference.

No. 46 outer tire tread groove design.

No. 47 inner tire area for wheel bearings for rotation.

No. 48 connection point of tire side wall to wheel 44.

No. 49 inner tire tread surface area of balloon tire.

No. 50 concentric centerline axis of rotation of balloon tire.

No. 51 is the width of channels 8.

No. 52 angle of offset of channels 8 from centerline axis 37.

FIGS. 1–16 are Shown in Cross Sectional View
with the Tread Material Thickness Dimensions for
Isoplast Shown in Approximate Actual Size FIG. 1 shows basic locking circular groove being concentric to internal wheel bearing bore 12.

Figure 2:
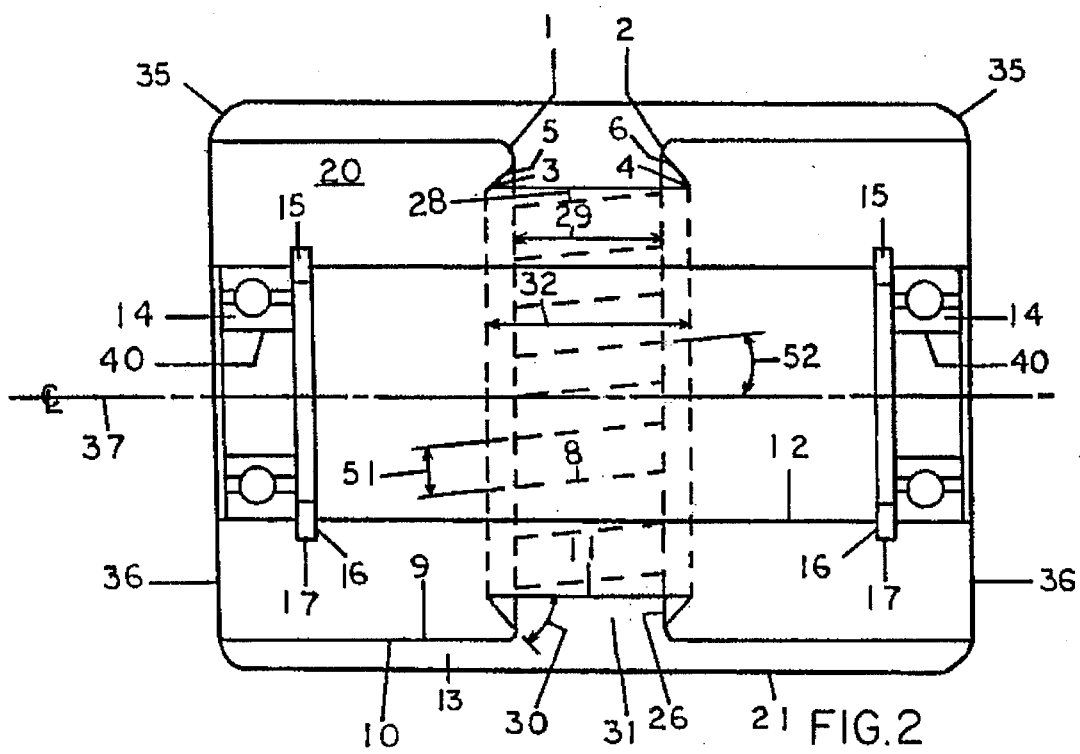

FIG. 2 shows locking circular groove of FIG. 1 with internal channels 8 also concentric to internal wheel bearing bore 12.

Figure 3:
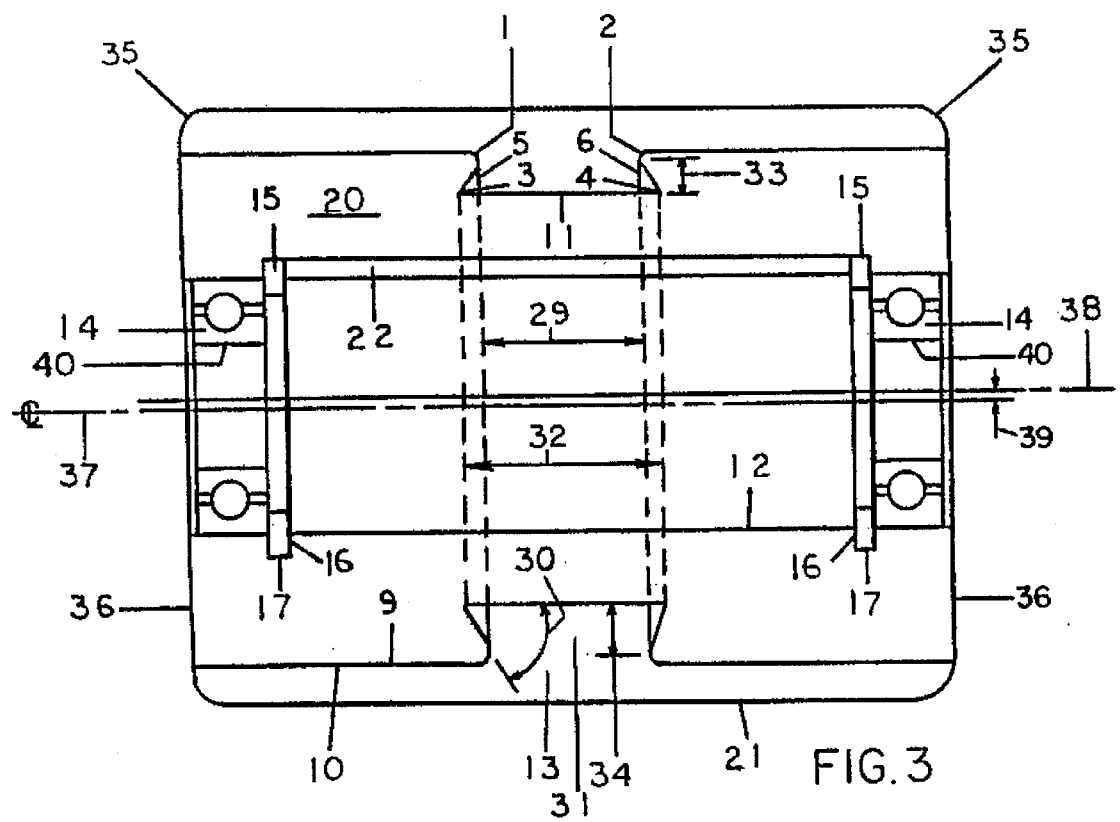

FIG. 3 shows locking circular groove being eccentric to internal wheel bearing bore 12 without channels 8 in locking circular groove.

Figure 4:
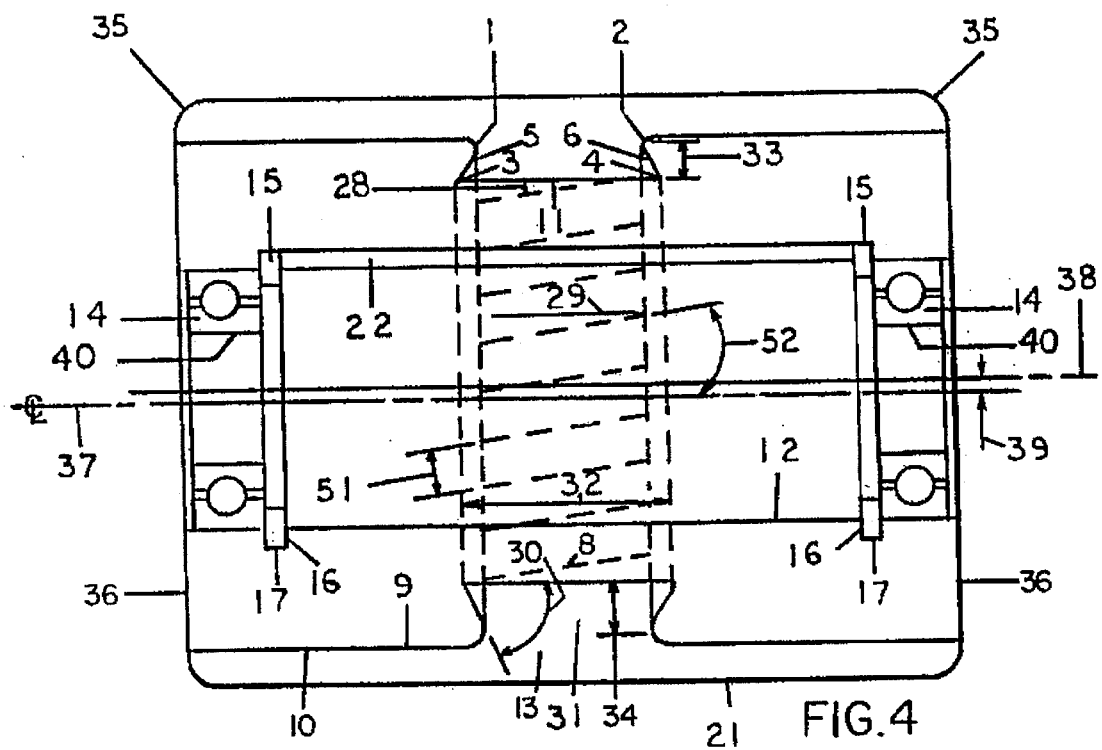

FIG. 4 shows FIG. 3 with channels 8 in locking circular groove eccentric to internal wheel bearing bore 12.

FIG. 5 shows locking circular groove being concentric to internal wheel bearing bore 12 with concave radius 7 in bottom of locking circular groove.

FIG. 6 shows locking circular set up of FIG. 5 with addition of channels 8 in locking circular groove being concentric to internal wheel bearing bore 12.

Figure 7:
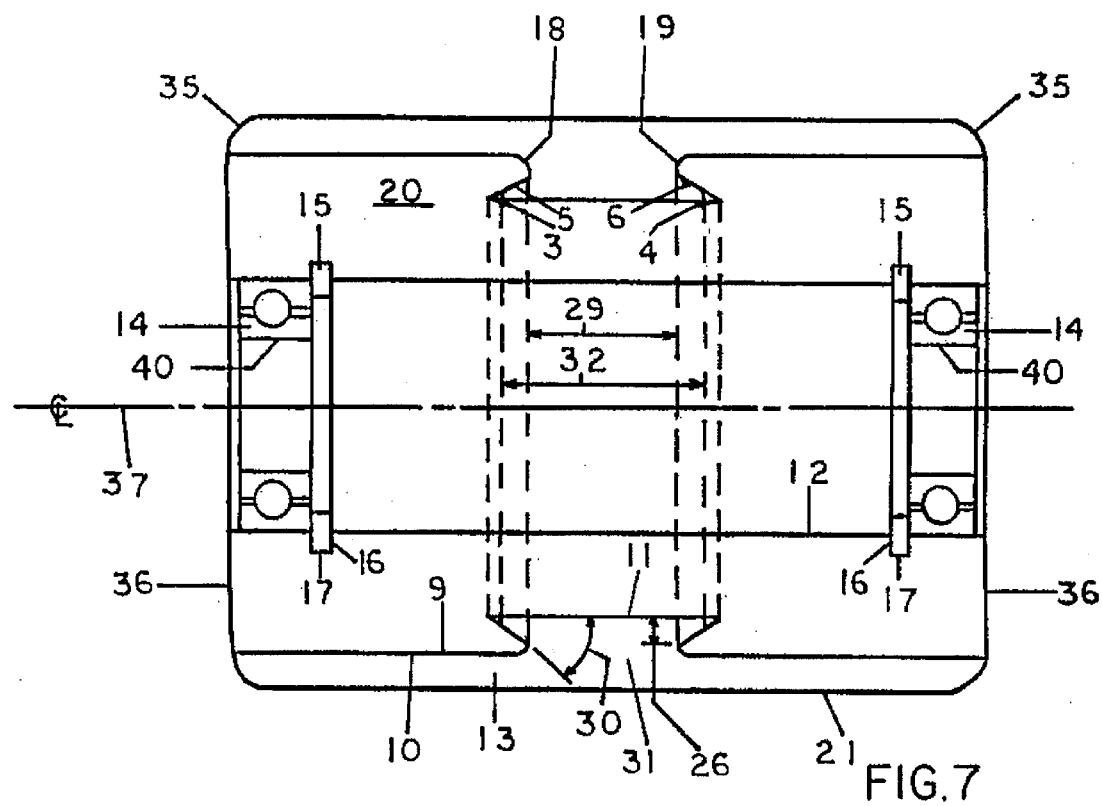

FIG. 7 shows FIG. 1 with protruding bulbs 18 and 19 with locking circular groove being concentric to internal wheel bearing bore 12.

Figure 8:
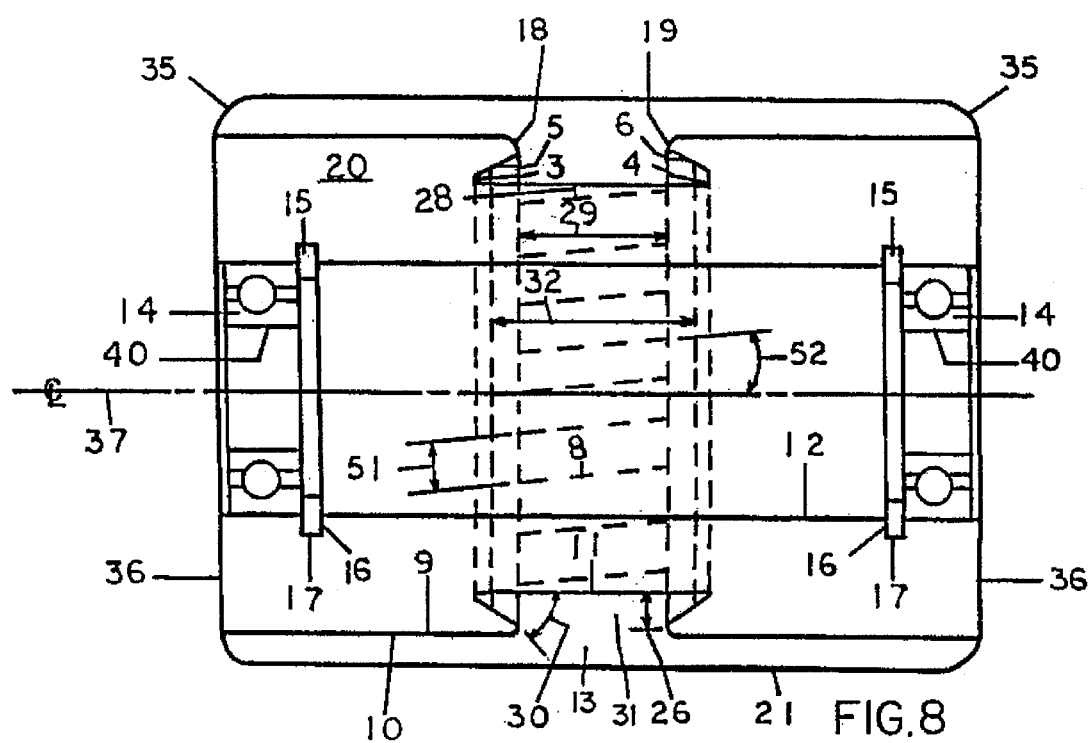

FIG. 8 shows FIG. 7 with locking circular groove, with addition of channels 8 in locking circular groove being concentric to internal wheel bearing bore 12.

Figure 9:
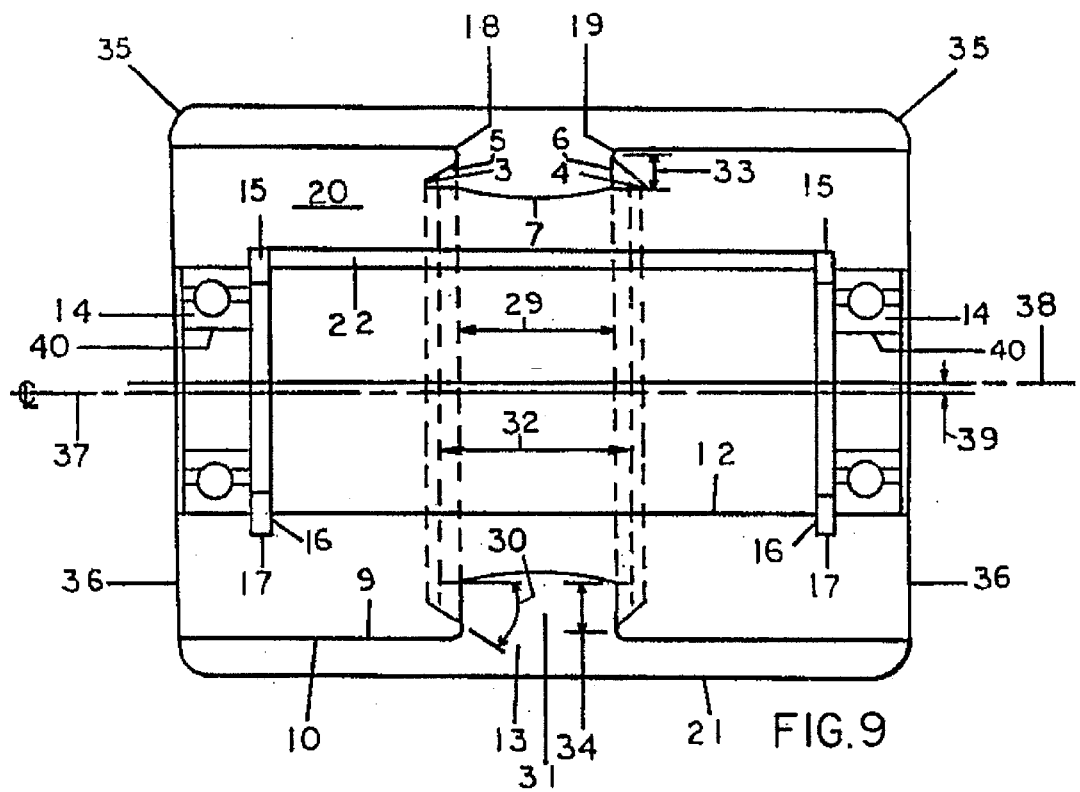

FIG. 9 shows FIG. 3 with addition of protruding bulbs 18 and 19, with locking circular groove being eccentric to internal wheel bearing bore 12.

Figure 10:
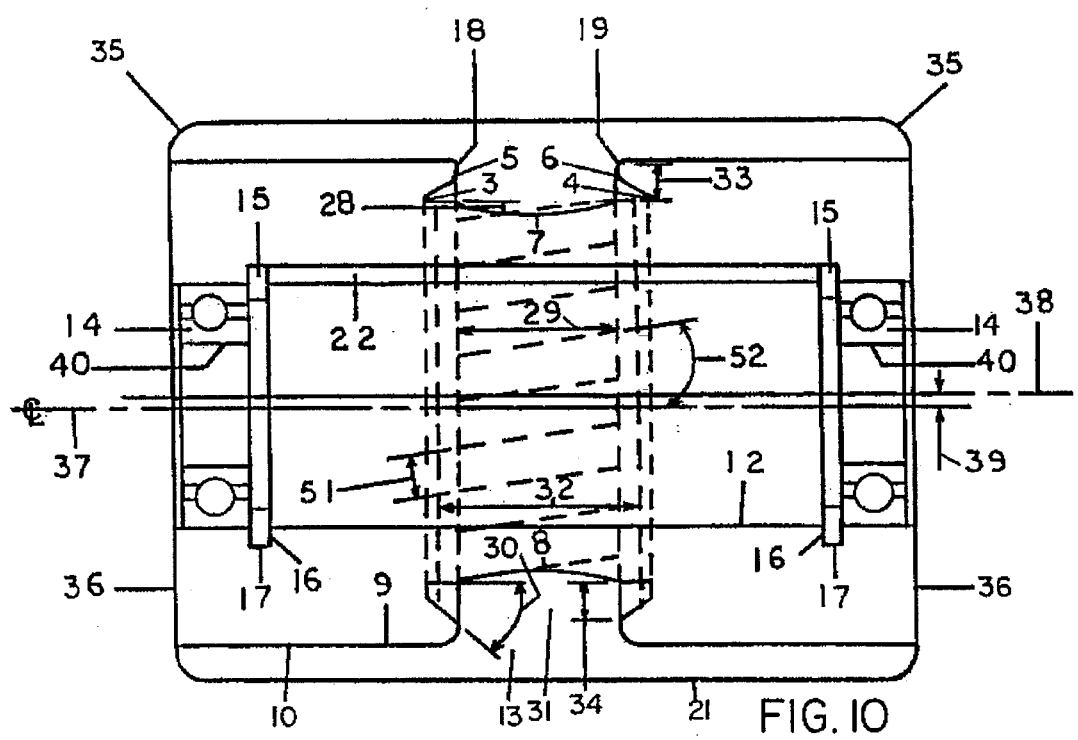

FIG. 10 shows FIG. 9 with addition of channels 8, with locking circular groove being eccentric to internal wheel bearing bore 12.

Figure 11:
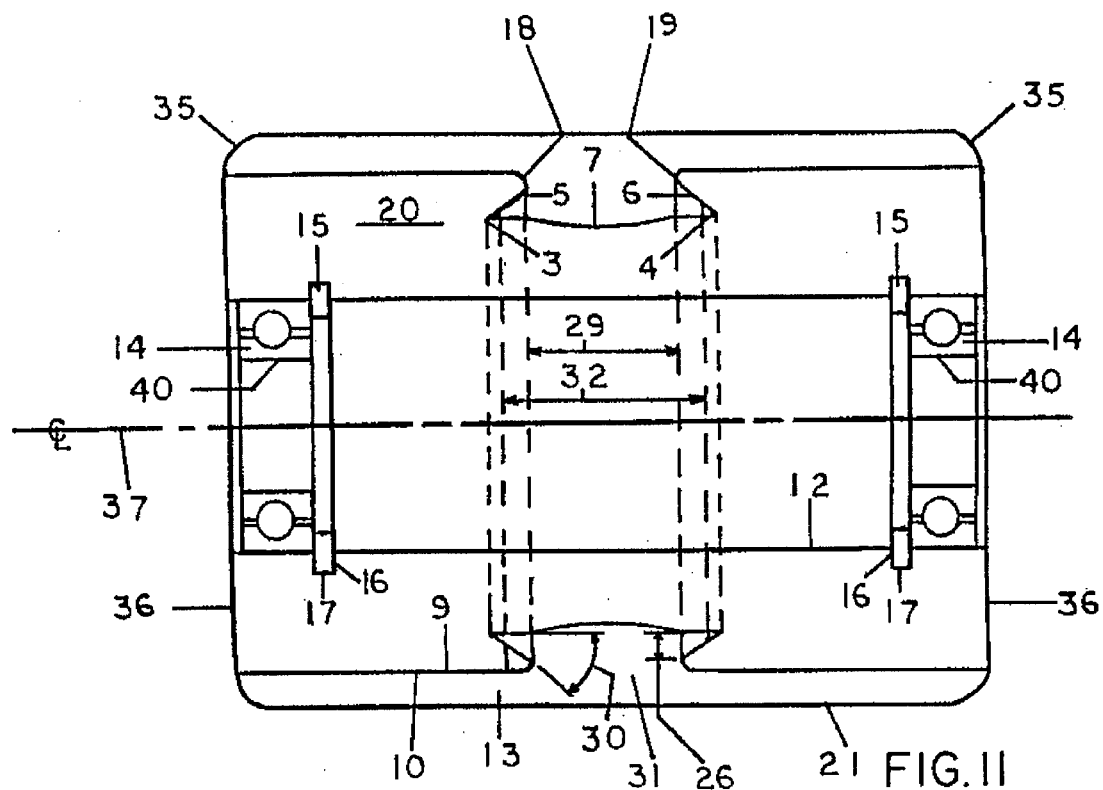

FIG. 11 shows FIG. 5 with addition of protruding bulbs 18 and 19 with locking circular groove being concentric to internal bearing bore 12.

Figure 12:
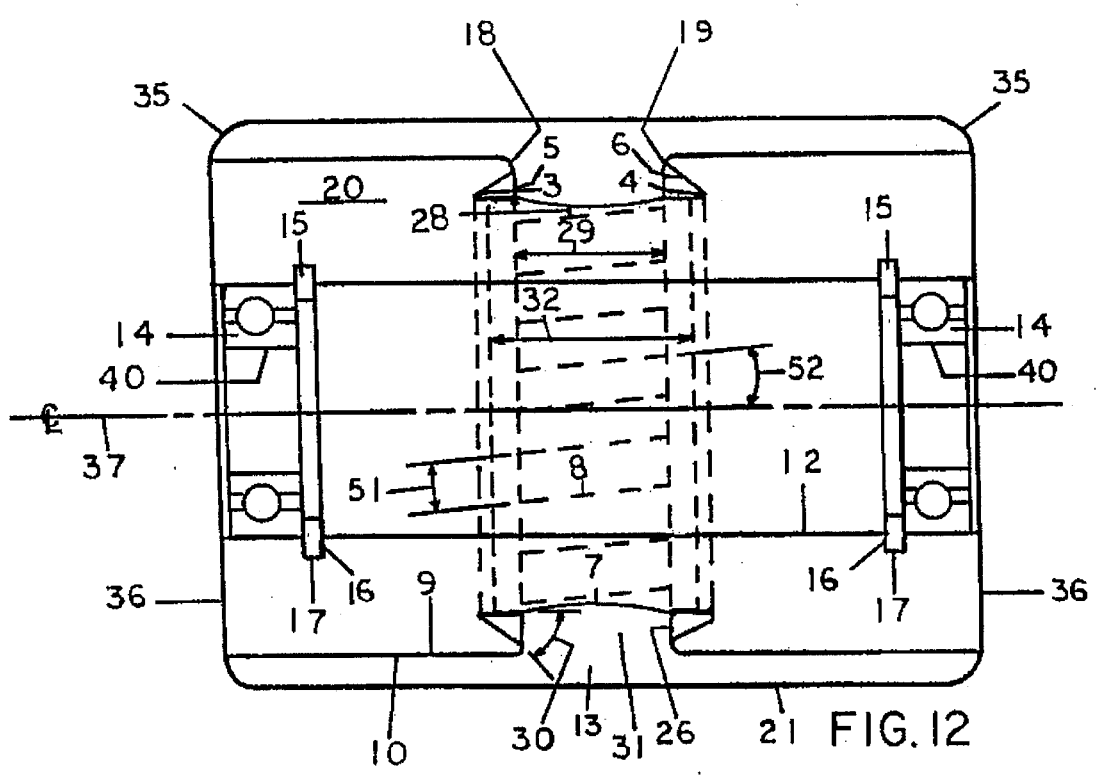

FIG. 12 shows FIG. 11 with addition of channels 8, with locking circular groove being concentric to internal wheel bearing bore 12.

Figure 13:
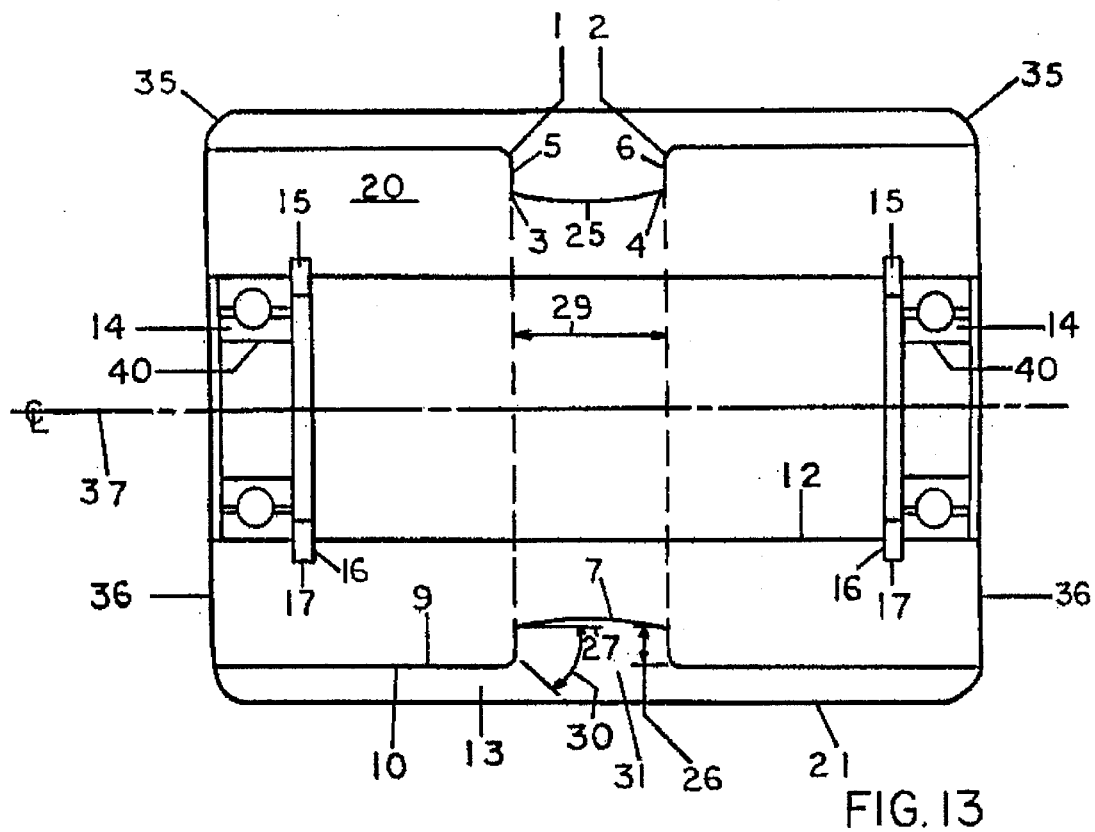

FIG. 13 shows a locking circular groove with sides 5 and 6 being parallel and at 90° to the concave radius 7 running axially, with the locking circular groove being concentric to internal wheel bearing bore 12.

Figure 14:
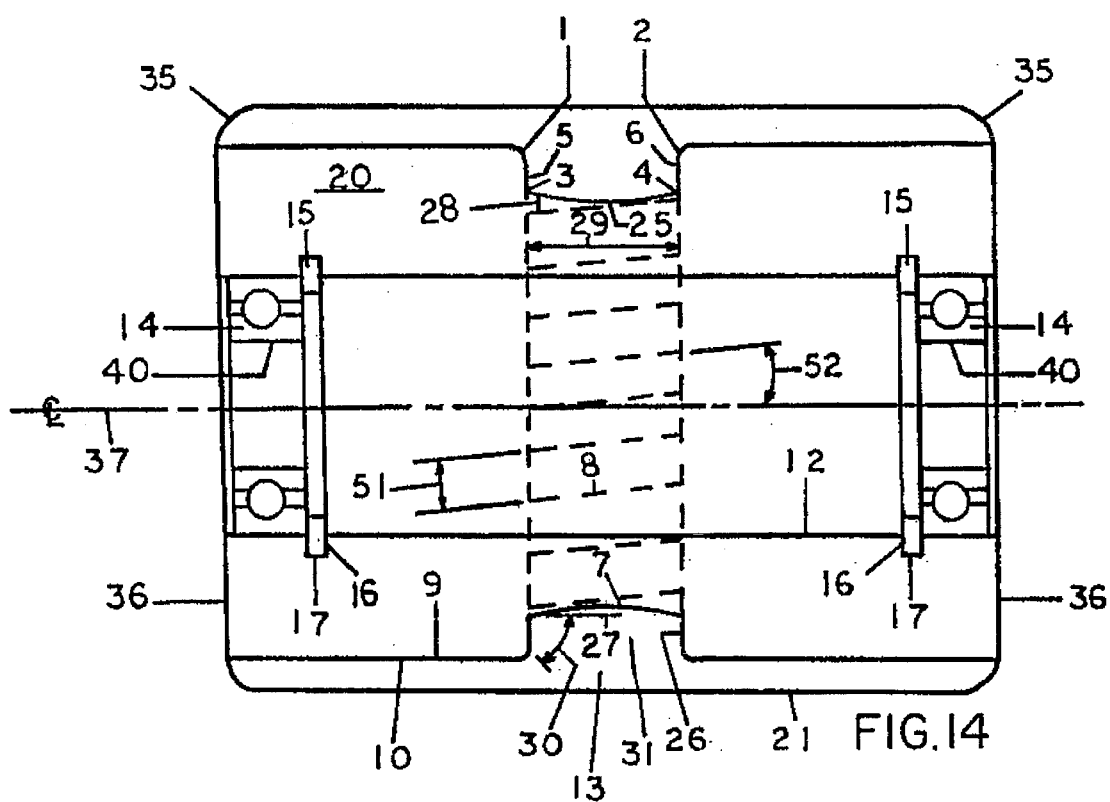

FIG. 14 shows FIG. 13 with addition of channels 8 and the locking circular groove being concentric to internal wheel bearing bore 12.

Figure 15:
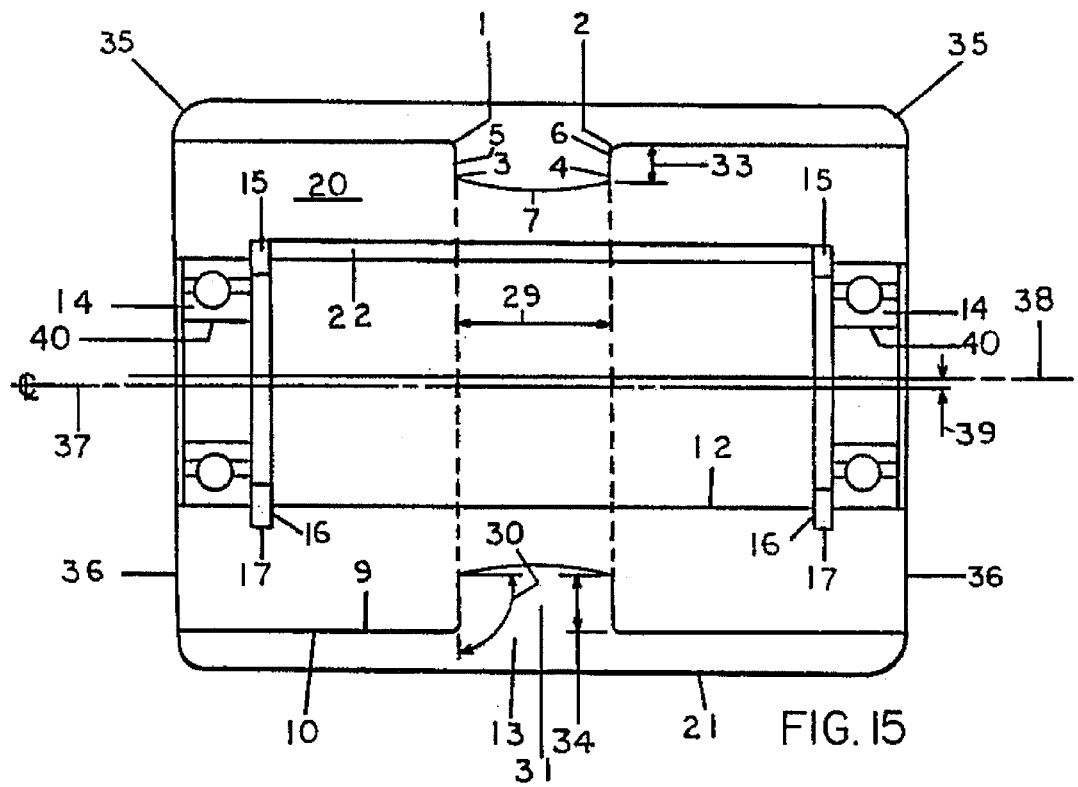

FIG. 15 shows FIG. 13 with the locking circular groove having sides 5 and 6 being parallel and at 90° to the concave radius 7 running axially and the locking circular groove being eccentric to internal wheel bearing bore 12.

Figure 16:
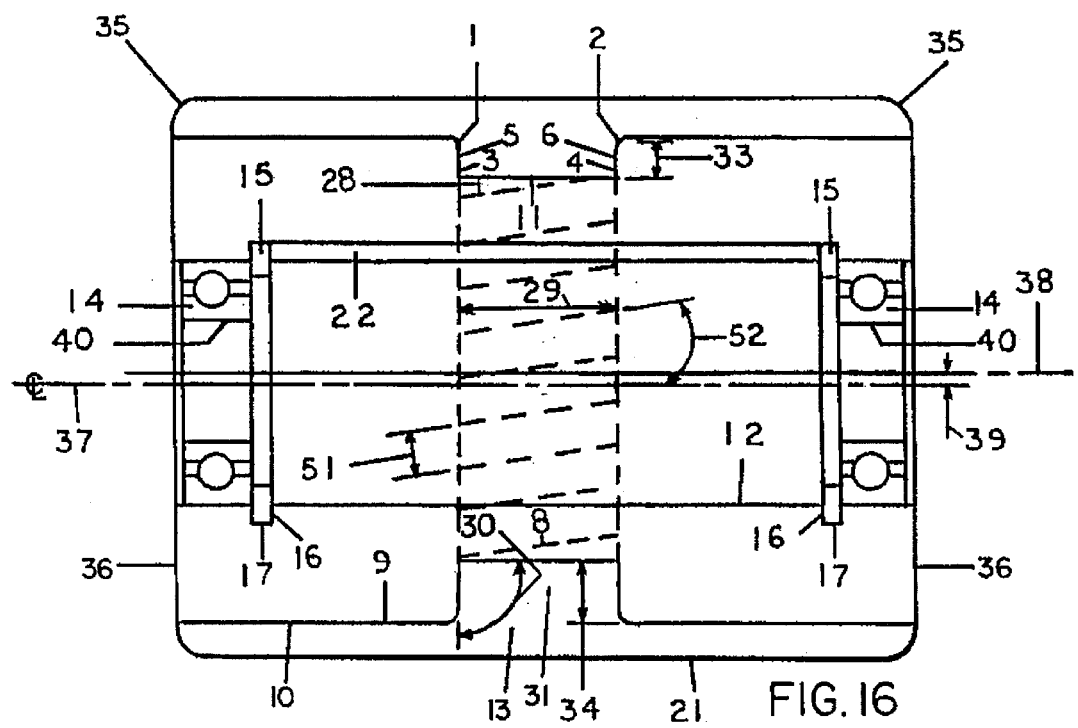

FIG. 16 shows FIG. 15 with addition of channels 8 and the locking circular groove being eccentric to internal wheel bearing bore 12.

Figure 17:
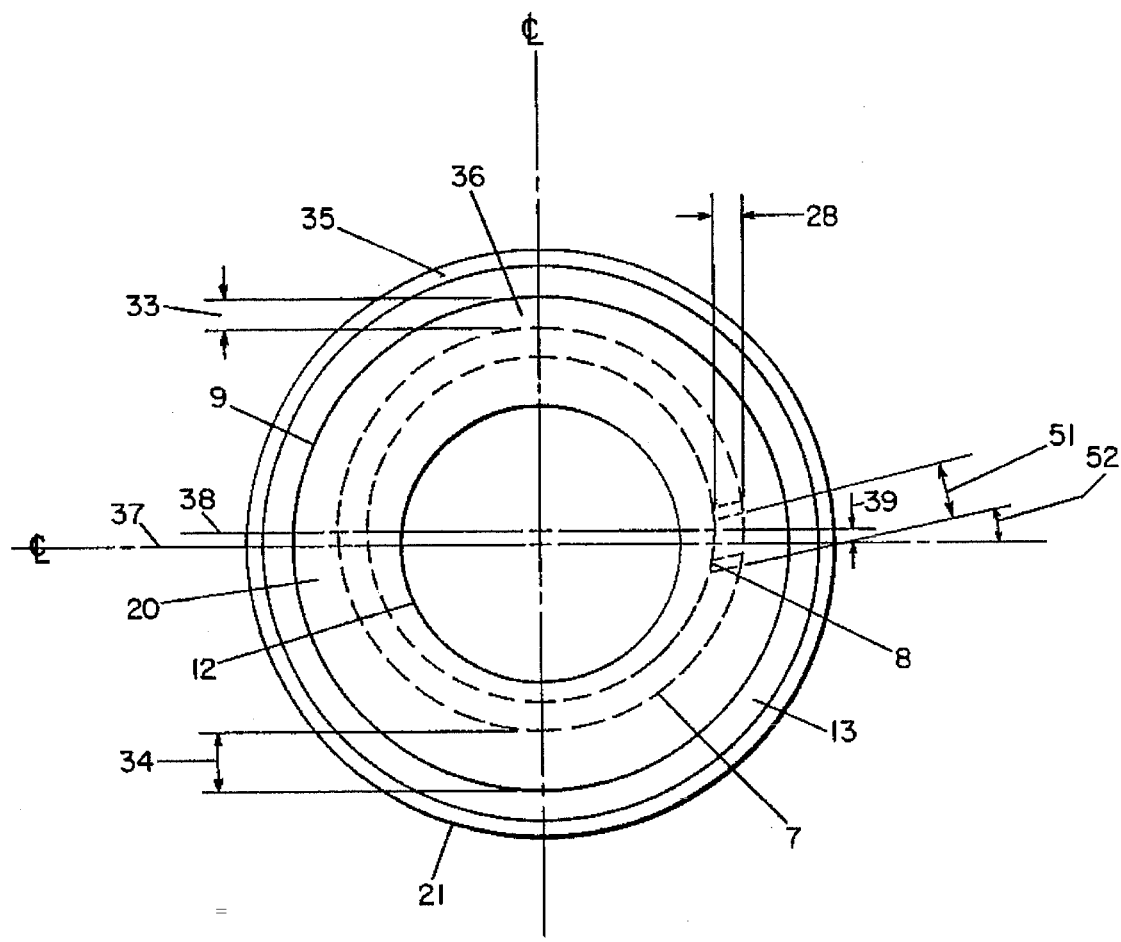

FIG. 17 shows cross section of FIG. 10 showing channels 8, and shows wedging action between 7 and 9.

Figure 18:
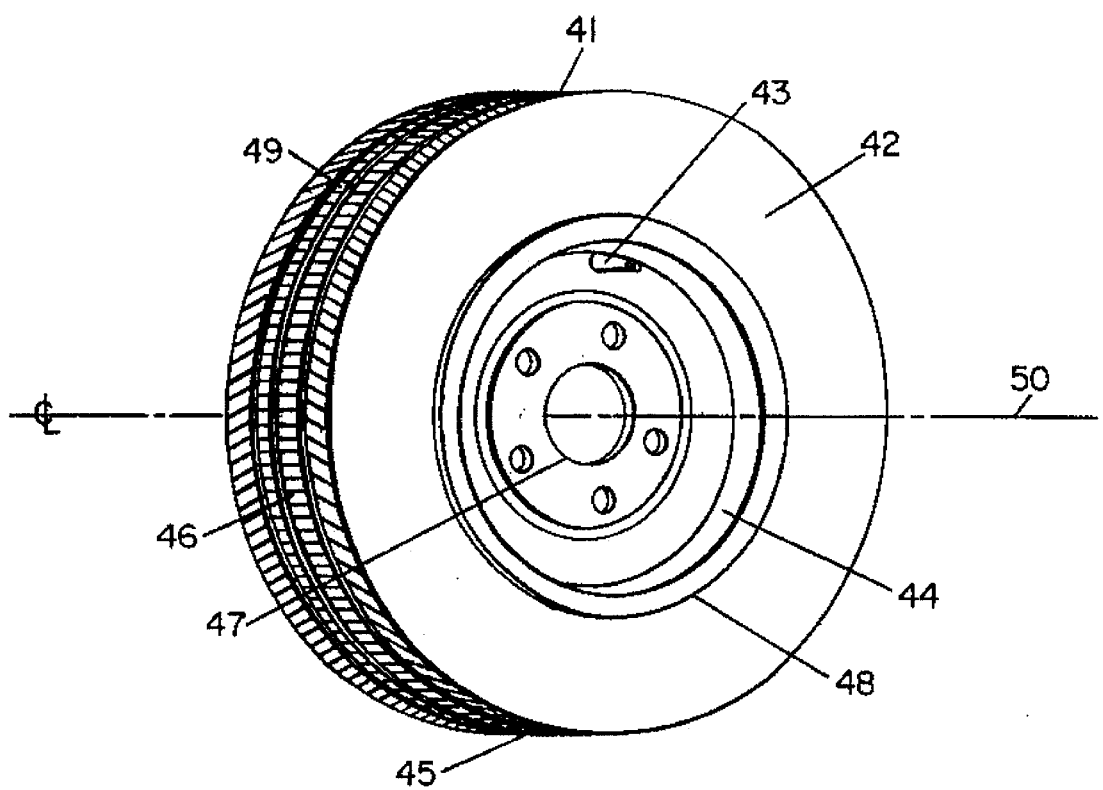

FIG. 18 shows a balloon tire.

DESCRIPTION OF EMBODIMENT

This invention is designed to supply bonding between extremely difficult to bond materials, such as Isoplast® grade 202, a rigid polyurethane, an amorphous resin with crystalline properties having a load rating of at least ten times that of the best domestic or foreign made material overseas. The tensile strength load rating of Isoplast® 202 is 9,000 pounds per square inch with a compression load rating of 11,500 per square inch. The tensile strength load rating of the best domestic or foreign made material is from 800 to 900 pounds per square inch with a compression load rating of about 900 pounds per square inch. An alternate material such as Victrex Peek® 450G has tensile and compression ratings of about 50% higher than Isoplast® 202 as well as non-bondable materials with wheel hub body designated as 20. Isoplast® grade 202 is an impact modified engineering resin that is highly resistant to acids and chemicals. The wheel hub body 20 is made of metal although it can be made of any other suitable rigid material, e.g., metal tubing, metal castings, that can have the locking circular grooves cast into the wheel hub body 20 with concave radii 7, internal locking channels 8, etc., described further on as well as non metallic materials that are capable of supporting a load either for dynamic or static conditions.

This bonding is achieved with the wheel tread lock groove taking advantage of the shallow depth from wheel hub outer diameter to bottom of wheel tread locking groove. The wheel tread lock groove is also known as the locking circular groove. FIGS. 1–16 show one locking circular groove on each wheel hub 20. In the making of wheel hub body 20, it is made with a number of locking circular grooves in proportion to its width to take advantage of maximum retaining force as well as providing maximum support for the wheel tread 13 while in rotation and under load use conditions. The following locking circular grooves shown and described herein for FIGS. 1 through 16 are made with special form cutting tools on conventional lathes and other standard machine shop machinery using conventional machine practices, and other related various industrial practices. This is necessary to have the locking circular grooves match the shape of the form tool and to achieve the specific ratio for outer opening width of the locking circular groove 29 to the total of dovetail depth 26 plus depth of concave radius 7 to be 1 to 1 to 8 to 1. The actual ratio may be dictated by the hardness and tensile strength of the tread material 13. The ratio is chosen to give the best bonding or retaining force for the selected tread material 13. The ratio for radii 1 and 2 to depth 26 which is about 4 to 1 to about 8 to 1 for concentric locking circular grooves or 33 and 34 for eccentric locking circular grooves.

The wheel hub 20 contains various wheel bearings 14 and 14, which consists of a straight through precision bearing bore 12 bored through in one operation from one side to the other producing the most accurate product.

A distance in from one end through to cover the width of the wheel bearing 14 plus a clearance with a true-arc snap ring 15 in an internal counterbore called a snap ring groove 16 will provide for a bearing stop and placement of the wheel bearing 14. The distance in for placement can be equal for both wheel bearings 14 and 14 that are pressed in each end of the bearing bore 12, for various loads and running conditions. No. 40 is the inner race bore of the wheel bearing 14 where a typical axle shaft is used to support the wheel for rotation and load use. The present invention has many applications. The materials designated as 13, to be bonded, can range from engineering thermo plastic resins as well as other thermo plastic resins and plastics to a wide range of metals. The axis of the circumference (outer diameter) 9 is always in the same plane as the axis of rotation being concentric at all times as well as to the internal wheel bearing axis. The axis of the locking circular groove is in line with the axis of the wheel hub center which is also the center for the wheel bearings 14 and 14 in this wheel tread lock wheel assembly. The bottom surface portion of the locking circular groove being straight across from the adjacent sides 5 and 6 is designated as 11.

The bottom surface portion of the Locking Circular Groove having the concave radius between adjacent sides 5 and 6 is designated as 7.

Channels 8 can also be used in the bottom of the locking circular groove or grooves 7 or 11 between the adjacent sides 5 and 6 to offer a third access lock. These locking sides 5 and 6 are normally straight but could be slightly concave to the locking circular groove or Grooves, if preferred. Also, the axis of the locking circular groove can be offset from the axis of the wheel hub containing the inner bearings' center. This offset now creates an eccentric between the locking circular groove and the inner wheel bearings. This eccentric can also be used as a balancing device to offset any internal channel or channels 22, positioned between the wheel bearings 14 that are used for lubrication to lubricate these wheel bearings which are in the internal bearing bore. The internal channel 22 is positioned 180° opposite the major depth of the eccentric in the locking circular groove located on the wheel hub.

In the prior art wheels are made by pressing or molding the tire or tread into recesses in the hub or rim and locking by the use of cement and by curing in contact with the hub or rim by placing rigid elements or braces within the tread material. Heating elements are used to mold tread material in a circular groove in J. A. Swinehart's patent.

The engineering thermoplastic polyurethane designated as Isoplast® 202 for tread material 13 of my invention is molded around the wheel hub body 20 by various injection molding methods; e.g., injection molding. The injection molding process for molding the wheel tread 13 for Isoplast or Victrex Peek® consists of using a horizontal or vertical molding machine with properly dried and heated engineering resin from a descicant drier inserted in the molding machine hopper with the barrel feeder heated to high heat then injected into a wheel mold where there is a wheel hub 20 (insert) that is placed in the center over the ejection ram, then the cover is closed by the injection molding machine. Next, the Isoplast or Victrex Peak materials are injected in through the cover through the screw bushing and forced through the gating by pressure, then around the wheel hub (insert) and then allowed to cool to a set temperature or a preheated low mold temperature if desired. Then the molding machine opens with the cover attached and the ejection ram pushes against the bearing placement snap ring 15 and out comes the finished molded wheel tread 13 on the wheel humb 20 now called a wheel product. Color concentrate containing carbon or other additives can be added for color with improved abrasion resistance that is needed in wheel tread material 13 for load wheels, etc. to these engineering resins if desired.

In addition, the melt and pour cast process can be used with my wheel hub body 20 for other than engineering resins, e.g., low cost polyurethanes as well as other various wheel tread materials. My invention uses no such electrical material conducting elements to carry any electrical currents. When the material cools, contraction takes place. This is known as material shrink. This material shrink provides additional locking force for the tread after it fills the tread locking circular groove as well as locking onto the outer circumference of the hub. The material exhibiting a certain amount of compression strength is locked in the locking circular grooves.

The tread 13 cannot be pulled out. This is locking in one axis radially. The tread 13 cannot be pulled from side to side. This is locking in the second axis axially. The tread 13 cannot spin around the wheel hub. This is locking in the third axis tangently to radius. This completes a three-axis lock.

"These locking circular grooves are specially designed with minimum depth and specific ratios due to meet the specific characteristics of Isoplast requiring thin section thicknesses of material to obtain strength of material as stated by the material manufacturer."

Materials that exhibit little or no material shrink are further locked circumferentially (tangently to radius) by a geometric wrap within the locking circular groove resulting from the offset (39) between axis centerline 38 of the eccentric locking circular groove to bearing centerline axis 37.

The offset of the axes 39 sets up a wedging action locking the tread material 13 to wheel hub body 20 as tread is forced around circumferentially in one direction while hub is turned in the opposite direction, approximately one-third turn but not to exceed one-half turn. This is desired when there is no material shrink. When there is no offset between the axes, circumferential locking can be obtained by using an adhesive 25, or channels 8 (discussed further on in this patent application) specially and exclusively designed for the Isoplast® and Victrex Peek® tread material 13. As mentioned now one such adhesive that can be used is a one-part epoxy having the trade name of Accuthane, its an Isocyanate based product, having the chemical name of Methylenebis (phenylisocyanate). The ingredients of this one-part epoxy consist of this Methylenebis Phenylisocyanate being about 30% and about 10% of Aluminum Oxide, and about 10% Silica-Amorphus and other epoxy ingredients, Part No. UR1100, manufactured by H. B. Fuller Company, in Grand Rapids, Mich.

The epoxy adhesive 25, can also be used for better adhesion and sealing between tread material 13 and the wheel hub body 20, as well as to have a locking circular groove or grooves with sides 5 and 6 being parallel instead of being on angles as shown in FIGS. 1–12. The adhesive 25, when used will prevent pull-out of tread material 13, from the locking circular groove or grooves.

This epoxy hardens rapidly when brought to the temperature of about 165° F., when the hot resin hits the wheel hub body 20 (commonly known as the insert when used in the injection molding process) coated with this epoxy in the wheel mold for wheel tread 13 molding during the injection molding process there are some grades of aluminum used as the insert or wheel hub that can reflect the heat during molding and aid in producing a better finished wheel tread 13. The engineering thermo plastic resin product after properly being molded with full mechanical properties primarily to be used with the wheel tread lock groove invention is, a rigid engineering thermoplastic urethane material somewhat harder in Durometer rating, that will provide an excellent qheel tread for heavy loads and tough running conditions, which also is classified as a high-heat resin is called "Isoplast® grade 202."

The ingredients of this grade of 202 Isoplast® are Polyurethane from 4,4'-Methylene Diaphenyl Diisocyante, 1,4-Cyclohexane Diamethanol >88% Acrylic Polymer Modifier 10%. These ingredients are about the same basically with percentages of chemical makeup varying for other grades of Isoplast and with the addition of glass fibre content for the glass reinforced grades of Isoplast.

The Isoplast product mentioned here as well as all other grades of Isoplast, e.g., grades 101, 151, 201, 202, 300, 301, 302, 101LGF40, 101LGF60, 202LGF40, 202LGF60, etc., are manufactured by Dow Chemical Company, Midland, Mich. This material is an amorphous resin with crystalline properties. It is in the engineering resin group. Isoplast will not creep and elongate like other materials with crystalline properties. Another engineering thermo plastic resin family for high-heat performance which can be used for a tread material 13 and also as a bearing material is "Victrex® PEEK (Polyetheretherketone). It is a high temperature engineering thermo plastic. Grade 450 G can be used for special wheel tread material 13. It is strong, tough and rigid with very good chemical and radiation resistance significantly, its excellent mechanical properties are high temperatures (above 400° F.

This extremely valuable combination of properties unique in a thermo plastic material, results from the linear aromatic structure of Victrex® PEEK. The chemical formula structure

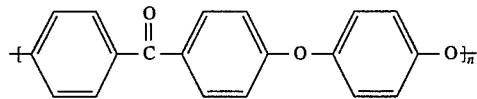

is representative of PEEK. This material is available from ICI Materials, a business unit of ICI Americas Inc., located in Exton, Pa. Victrex Peek like Isoplast will not creep and elongate as other engineering resins with crystalline properties do.

An example of such a material with crystalline properties that has creep and elongation is Nylon either with or without glass additives. The internal wheel bearing bore 12 runs axially through the wheel hub body 20 and is concentric to the outer circumference 9 of wheel hub body 20. This internal wheel bearing bore 12 is machined in one continuous operation thereby making the internal wheel bearing bore 12 absolutely straight. This feature enables the wheel bearings numbers 14 to always be in perfect alignment with a true running axis.

FIG. 1 shows the general set-up of the locking circular groove area 31 with a uniform groove depth 26 exhibiting a ratio of about 4 to 1 to about 8 to 1 dimensionally for radii 1 and 2 to groove depth 26 around the wheel hub, and the locking circular groove having its centerline axis concentric to the internal wheel bearing bore 12, that is concentric to the centerline axis of rotation 37.

FIG. 2 shows a locking circular groove similar to that of FIG. 1 with the addition of channels 8. Channels 8 can be notches or straight splines 8 running axially in position to internal wheel bearing bore 12 on a slight angle offset several degrees from the centerline axis 37 of rotation, the result of the actual machining whereby the supporting wheel arbor axis fixture is higher on one end instead of being parallel to the vertical milling machine "Y" (left to right) table axis during machining with the rotating woodruff style cutter in the milling machine spindle while the milling machine is in operation during machining of channel grooves 8. This practice was done to avoid chatter and this trade secret is now disclosed. These channels are formed with a shallow depth and have either angled side walls or straight perpendicular side walls with its base being concave and located in the concave radius 7 which is the preferred embodiment or in straight surface 11 between corners 3 and 4 that run circumferentially in the bottom of the locking circular groove.

The channels 8 and the depth of the channels 28 are used to provide an additional amount of positive locking power to stop any tread spin around the wheel hub.

FIG. 3 shows the general set-up of the locking circular groove around the wheel hub having its centerline axis 38 being eccentric to the internal wheel bearing bore 12 centerline axis 37 along with an internal channel in the bearing bore 12. The locking circular groove can be placed in the center, or it can be placed to the right or left side of the wheel hub if necessary. There can be one or more locking circular grooves depending on the amount of tread lock desired as well as the width of the wheel hub. The stronger the compression factor of the material being bonded, the stronger the bond to the wheel hub body 20. The major depth 34 of the locking circular groove is spaced 180° from the minor depth 33 being directly over the material missing from the lubricant channel 22 in the internal wheel bearing bore 12. The dimension of offset is determined by the amount of weight of material removed from this lubricant channel in the bearing bore. The amount of volume of weight is then transferred to dimension of depth difference between minor and major depths. This practice is done to dynamically balance the wheel hub body 20, thus providing vibration-free performance at high speeds in wheel operation. In hubs without lubricant grooves, the offset of the axes 39 can be kept to a minimum or zero.

The width of the opening to the locking circular groove 29 should be wide enough to provide a sufficient cross sectional area of material tread width to give a necessary amount of tensile strength to prevent breakage at this area from the rolling load conditions when in use. Also to have a sufficient ratio of about 2 to 1 to about 4 to 1 for width to depth to allow proper flow of injected tread material 13 into the locking circular groove area 31 further assisted by the radii 1 and 2 which allows maximum ease of molten tread material 13 to flow in the locking circular groove internal circular corners 3 and 4 without a radius between 3 and 5, 4 and 6. The ratio chosen for a specific application will generally depend on the tensile strength and the compression strength of the tread material 13. The locking surface angles 30 of sides 5 and 6 can range from less than 90° to forming an angle small enough that will just permit the entry of the molded on tread that will flow into the internal circular corners 3 and 4 of the Locking Circular Groove. (This is for FIGS. 1–12. With respect to FIGS. 13–16 the angle from sides 5 or 6 to the concave radius 7 or to the straight surface 11 is 90° respectively for each side measured.) The angle is measured from sides 5 or 6 to straight surface 11 typically shown for the FIGS. 1–12. The locking surface angles 30 can range from a minimum of about 15° to a maximum of about 90°.

For the best performance the harder and the more tensile strength the tread material 13 has the larger or steeper the angle can be. A locking surface angle 30 of 60° would give good holding strength along with a major depth of approximately 0.25" for materials of rubber to various metals for the wheel tread material 13.

The width of the locking circular groove 29 between 1 and 2 should be wide enough to provide sufficient cross section of material tread width that will provide an amount of tensile strength in pounds per square inch but not too wide in relation to locking circular groove depth 26, or 33, 34 providing a ratio of about 2 to 1 to about 4 to 1 depending on hardness of tread material 13. This ratio results in positive bonding hold down force. The depth of the locking circular groove should be limited by providing sufficient thickness of wheel hub material between locking circular groove or grooves depth surfaces 7 or 11 and the inner bearings 14, depth stops 16, snap rings 15, grooves with 17, thrust bearing counter bore depth so as to provide protection against breakthrough of wall material which would cause product failure.

FIG. 4 shows FIG. 3 with addition of channels 8 between corners 3 and 4 to provide an additional positive locking force, and with its locking circular groove centerline axis 38 being offset (39) and eccentric to the internal wheel bearing bore 12 centerline axis 37 of rotation.

FIG. 5 shows a locking circular groove with a concave radius 7 and having a depth designated as 27 between the sharp internal circular corners 3 and 4 of the internal circular locking inclined angle sides 5 and 6 of the locking dovetail groove with the use of this concave radius 7, the force necessary to pull out the tread material 13 from the locking circular groove will be increased by 50 to 100 percent. There exists a definite ratio of about 2 to 1 to about 10 to 1 for this relationship depending on wheel tread support required. The lower this ratio is starting from a minimum of 2 to 1 the higher the percentage of pull out force that is required to pull out the tread material 13 from the locking circular groove. The higher this ratio is the lower the force that is required to pull out the tread material 13 from the locking circular groove. The ratio chosen for a specific application will generally depend on the tensile strength and the compression strength of the tread material 13.

The function of the concave radius 7 is to put the material in the locking circular groove under compression by putting the holding power in the bottom of the dovetail between sides 5 and 6 causing a wedging action in which material in the dovetail at the bottom tends to come together but cannot because of the depth 27 of the concave radius 7 (as shown in FIGS. 5, 6 and 9–12) which does not allow the tread material to do so, thereby retaining the wheel tread material and securely locking it to the wheel hub body 20. The deeper the depth 27 of concave radius 7 the stronger the holding power of the Locking Circular Groove. This affords the wheel tread lock an additional mechanical advantage not found in the prior art, that before the tread pulls out, the material will break at point of inner tread surface 10 adjacent to circumference surface 9.

FIG. 6 shows FIG. 5 with addition of channels 8 between corners 3 and 4 to provide additional positive locking force.

FIG. 7 shows the basic Locking Circular Groove of FIG. 1 being concentric to internal wheel bearing bore 12 and having bulbs 18 and 19 (bulbs to mean a convex extension of radii 1 and 2) protruding from the ends of sides 5 and 6 forming new corners 23 and 24 contacting these sides 5 and 6 respectively as shown in FIGS. 7–12, being at the entrance of the locking circular groove adjacent to the circumference surface 9 in place of radii points 1 and 2 in the locking circular groove.

These bulbs 18 and 19 run circumferentially as they are adjacent to surface 9. These bulbs can be used for very soft tread material, if desired. These bulbs have the same definite radii approximately as radii 1 and 2, and about the same ratio of about 5 to 1 in relationship to the depth of the locking circular groove bottom surface, 7 or 11.

FIG. 8 shows FIG. 7 with addition of channels 8 to provide additional positive locking force, with locking circular groove being concentric to internal wheel bearing bore 12.

FIG. 9 shows the eccentric locking circular groove of FIG. 3 with concave radius 7 in the bottom of the locking circular groove in place of the straight surface 11, and with the addition of protruding bulbs 18 and 19, with locking circular groove being eccentric to internal wheel bearing bore 12.

FIG. 10 shows FIG. 9 with the addition of channels 8 to provide an additional amount of positive locking force and locking circular groove being eccentric to internal wheel bearing bore 12.

FIG. 11 shows FIG. 5 with addition of protruding bulbs 18 and 19 and the locking circular grooves being concentric to internal wheel bearing bore 12.

FIG. 12 shows FIG. 11 with the addition of channels 8 to provide additional positive locking force and the locking circular groove being concentric to internal wheel bearing bore 12. The locking dovetail grooves shown are for FIGS. 1–12 respectively.

FIG. 13 shows a locking circular groove with sides 5 and 6 being parallel and at 90° to the concave radius 7 in the bottom of the locking circular groove running axially and the locking circular groove having its centerline axis concentric to the internal wheel bearing bore 12, that is concentric to the centerline axis of rotation 37. The one part epoxy adhesive can be used to secure the wheel tread from turning on the hub with this locking circular groove design, if desired.

FIG. 14 shows FIG. 13 with addition of channels 8 and the locking circular groove being concentric to internal wheel bearing bore 12. Concave radius 7 is in the bottom of the locking circular groove running axially.

FIG. 15 shows FIG. 13 with the locking circular groove having sides 5 and 6 being parallel and at 90° to the concave radius 7 in the bottom of the locking circular groove running axially and the locking circular groove being eccentric to internal wheel bearing bore 12. With this locking circular groove design, the one part epoxy adhesive is usually not required because of the eccentric locking circular groove design which prevents any circumferential turning.

FIG. 16 shows FIG. 15 with addition of channels 8 and the locking circular groove being eccentric to internal wheel bearing bore 12. Concave radius 7 is in the bottom of the locking circular groove.

The UR-1100 epoxy adhesive is used exclusively for Isoplast and Victrex Peek to hold in the tread material 13, for some applications. These locking circular grooves shown in FIGS. 13–16 with sides 5 and 6 being parallel provide maximum bearing surface support for the underlying tread inner surface 10 of the tread material 13. The eccentric offset grooves shown in FIGS. 15 and 16 provide positive locking circumferentially, for the tread material 13. They also have the benefits of the locking circular dovetail grooves with the same ratios and radii 1 and 2, to prevent any damage to tread material 13, where the inner surface 10 contacts the circumference 9 on the wheel hub body 20.

The locking circular dovetail grooves (shown in FIGS. 1–12) have the following features, there are definite visible radii distinct and sufficient in size, also with a ratio of about 5 to 1 of radius dimension to depth of the locking circular groove bottom surface 7, and put the holding power on the lower portion of the sides 5 and 6 of the locking circular groove instead of at the usual top portions or points along the circumference 9 of wheels shown in the prior art.

Also to provide an amount of ductility necessary for various tread materials such as the Isoplast® grade 202 resin, (without any glass fibre content), and the remaining Isoplast family of resins for other specific tread materials if desired, the Victrex® PEEK resins, some of which can be used for bearing materials. An example of one such material is the Victrex® PEEK resin designated as 450FC30. Also there are other resins that can be used for tread or tire material, and others that can be used as bearing material, etc., between the material in the locking circular groove and the flexing tread in contact with the operating surface or floor. Ductility will reduce to a minimum the fatiguing at the radii points 1 and 2 which can cause separation between material in the locking groove and within the working tread below its point of surface contact 10 adjacent to circumference 9.

To allow proper flow of tread, additionally, these radii 1 and 2 surrounding outer circumferences of the locking dovetail groove to aid in filling of dovetail groove or grooves having sharp internal corners 3 and 4 (sharp corners can also be replaced with round concave corners if desired) of dovetail groove or grooves with sides 5 and 6 to complete wedging action.

Additionally, this radius will supply a structural anchoring point without any possible splitting of tread during rolling under load. A concave surface 7 in the bottom of the groove between the lower dovetail sides, sufficient in radius depth from a straight line across 3 and 4 exhibiting a ratio of about 2 to 1 to about 10 to 1 to put the material bonded under compression between the lower portion of dovetail sides 5 and 6 which will not permit the wheel tread material to pull out of the locking circular groove when in rolling motion or under static loading conditions. This compression resulting from heavy loads is contained between the dovetail sides 5 and 6, and radii 1 and 2 without spreading apart, which would result in tread material 13 being pulled out of the locking circular groove.

The wedging action takes place between the bottom of the locking circular groove 7 and the outer circumference 9, this is the result of the circular incline plane developed because of the tapering between surfaces 7 and 9 as the tread material 13 is forced between 7 and 9. The wedging action is further caused as the wheel tread 21 outer diameter surface contacting the road surface and resists normal turning, the wheel hub also resists turning on its axis normally as the pallet jack machine is at rest or in motion, e.g. "a body at rest tends to stay at rest," (this is a part of Newton's scientific law).

The above features provide maximum holding power with maximum width and minimum depth of dovetail groove or grooves for tread locking circular grooves around the wheel hub circumferentially. This results in maximum bearing surface from wheel hub outer diameter circumference 9, to inner tread surface 10.

The scope of this invention should not be limited by the number of locking circular grooves on the wheel hub body 20, or by any other quantitative element that could vary, e.g., size, number, etc., that is mentioned above.

Tread locking is accomplished preferably by the features listed herein using a locking circular groove or grooves with a specific ratio between depth of the groove or grooves and specific radii at the entrance of the locking circular groove or grooves along with the newly created concave radius having a specific ratio of about 5 to 1 to about 10 to 1 with relation from depth to width in the bottom of the locking circular groove or grooves if more than one locking circular groove is used.

While I have herein shown and described one embodiment of the invention, and have suggested certain changes and modifications thereto, it will be apparent to those of ordinary skill in the art who have read this description that still further changes and modifications may be made therein without departing from the spirit and scope of the invention.

I claim:

1. An improved wheel assembly including:

a wheel hub provided with bearing means adjacent either end thereof;

an oil passage in an inner portion of said wheel hub extending between said bearing means;

an offset continuous locking circular groove having a maximum and a minimum inner depth around said wheel hub;

said offset continuous locking circular groove with minimum inner depth located on outer periphery and being in the same radius plane as said oil passage from the centerline axis of rotation of said wheel hub and said maximum continuous locking circular groove depth located on outer periphery on the opposite side of said wheel hub from said oil passage to balance the wheel hub weight around said wheel hub centerline axis of rotation.

2. An improved wheel assembly as described in claim 1 wherein:

said inner depth of said continuous locking circular groove is in the form of a concave radii.

3. An improved wheel assembly as described in claim 2 wherein:

said concave radius has a ratio of width to depth from 2 to 1 to 10 to 1.

4. An improved wheel assembly as described in claim 1 wherein:

said inner base of said continuous locking circular groove has a channel groove formed on an offset angle from the centerline axis of rotation thereon to provide an additional wheel tread securing means.

5. An improved wheel assembly as described in claim 1 wherein:

the centerline of said continuous locking circular groove is offset from the centerline of said wheel hub to provide an additional resistance against tangential forces tending to separate said wheel hub from said wheel tread material.

6. An improved wheel assembly as described in claim 1 wherein:

said wheel assembly has a continuous straight through bore with snap ring grooves to provide a depth bearing stop adjacent to either end thereof and to provide a precision continuous axis for wheel bearings rotation around a given shaft.

7. An improved wheel assembly as described in claim 1 wherein:

said hub continuous locking circular groove has side walls that are formed in part by concave sections extending around said hub locking groove.

8. An improved wheel assembly including:

a wheel hub with a concentric centerline axis of rotation and a continuous locking circular groove around its outer periphery having a centerline axis offset from the concentric centerline axis of rotation for supporting a wheel tread material;

said wheel tread material being an amorphous resin with crystalline properties.

9. An improved wheel assembly as described in claim 8 wherein:

the ratio of an outer tread material radius measured from a point of origin on the wheel hub body circumference that forms a rounded corner between the side ends of the tread material and its outer contact surface running circumferentially on each end thereof to said tread material thickness is essentially <1 to 1 to 1 to 1.

10. An improved wheel assembly as described in claim 8 wherein:

said wheel tread material comprises a material having a molecular structure forming parallel straight molecular chains.

11. An improved wheel roller assembly including:

a wheel roller insert used for supporting a wheel roller tread on its outer periphery;

said wheel roller insert having an outer periphery being concentric to the centerline axis of rotation;

said wheel roller insert is used as an axle shaft;

said wheel roller insert is either solid or tubular in shape;

said wheel roller insert is comprised of non-metallic material;

a wheel roller tread material secured onto said wheel roller insert;

said wheel roller tread material is thermally bonded by injection molding onto said wheel roller;

said wheel roller tread material being an amorphous resin with crystalline properties;

said wheel roller tread material having a chemical formula of polyurethane from 4,4'-Methylene Diaphenyl Diisocyanate, 1,4-Cyclohexane Dimethanol of at least 88% and Acrylic Polymer Modifier 10%;

said wheel roller tread material having an Isoplast® chemical formula is additionally comprised of fibre glass content.

12. An improved wheel roller assembly including:

a wheel roller insert used for supporting a wheel roller tread on its outer periphery;

said wheel roller insert having an outer periphery being concentric to the centerline axis of rotation;

said wheel roller insert is used as an axle shaft;

said wheel roller insert is tubular in shape;

said wheel roller insert is comprised of non-metallic material;

a wheel roller tread material secured onto said wheel roller insert;

said wheel roller tread material is thermally bonded by injection molding onto said wheel roller insert;

said wheel roller tread material to have crystalline properties comprising of straight molecular chains with benzine rings;

said wheel roller tread material is a linear aromatic polyetheretherketone having a chemical formula structure

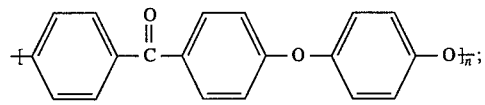

said wheel roller tread material of Victrex Peek® chemical formula is additionally comprised of fibre glass content.

13. An improved wheel assembly as described in claim 12 wherein:

said means to secure said wheel roller tread material is an adhesive bonding material between said insert and said wheel tread material.

14. An improved wheel assembly as described in claim 13 wherein:

said adhesive bonding material is a one part epoxy adhesive.

15. An improved wheel roller assembly including:

a wheel tread material having a chemical formula of polyurethane from 4,4'-Methylene Diaphenyl Diisocyante, 1,4-Cyclohexane Diamethanol of at least 88% and Acrylic Polymer Modifier 10%;

a wheel roller hub insert used for supporting a wheel roller tread on its outer periphery;

said wheel roller tread material to wheel roller hub insert securing is by an isocyanate base adhesive having about 30% methylenebis phenylisocyanate and 10% aluminum oxide and 10% silica-amorphus.

\* \* \* \* \*